André Rivoire
Inventor.

By Karl F. Ross
Attorney

André Rivoire
Inventor.

By Karl F. Ross
Attorney

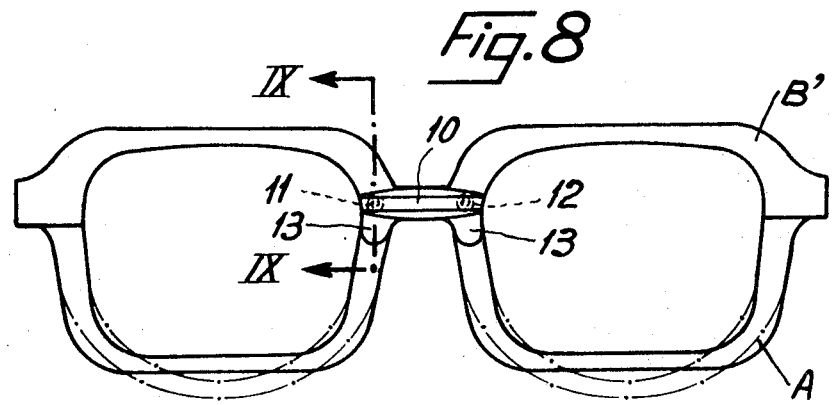
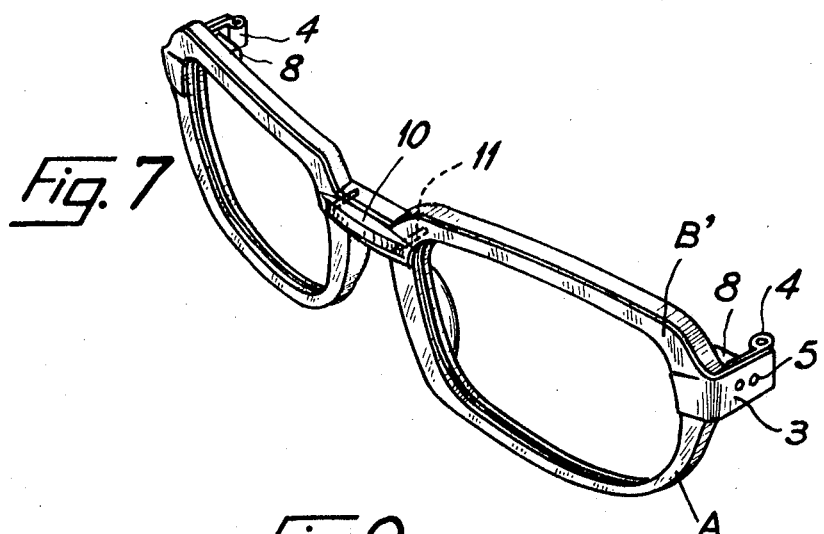
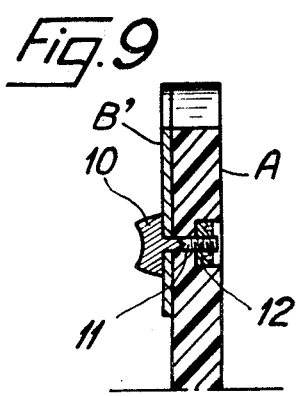

United States Patent Office 3,664,734
Patented May 23, 1972

3,664,734
COMPOSITE EYEGLASS FRAME
Andre Rivoire, Joinville, France, assignor to
Lux-Optical, Paris, France
Filed Sept. 4, 1970, Ser. No. 69,665
Claims priority, application France, Sept. 11, 1969,
6930887; July 9, 1970, 7025518
Int. Cl. G02c 1/00
U.S. Cl. 351—83                                    9 Claims

ABSTRACT OF THE DISCLOSURE

An eyeglass frame consists essentially of two juxtaposed layers, i.e. a plastic rear layer forming the interconnected eye rims and a metallic front layer extending over the bridge and at least the upper part of each eye rim. The metallic layer has lateral extensions forming hinged for the temples, the two layers being mechanically interconnected at these hingers and at the bridge.

---

My present invention relates to an eyeglass frame for any kind of spectacles, including optical glasses, goggles and sunglasses.

Such frames are generally made either of metal or of plastic material, though combinations of these two materials have already been proposed. In particular, it is known to laminate a decorative metallic facing onto a plastic frame body.

The general object of my present invention is to provide a composite eyeglass frame of metal and plastic utilizing to best advantages the dominant characteristics of the two materials, i.e. the mechanical strength of the metal and the deformability of the plastic.

A more specific object of this invention is to provide a frame of this description in which the movable parts, i.e. the hinges for the attachment of the temples, are of wear-resistant metal whereas the eye rims, designed to receive the lenses, are of plastic material yet wherein the metallic and polymeric components are firmly interconnected without welding or soldering so that metals not readily susceptible to thermal bonding (e.g. aluminum) may be used.

An eyeglass frame according to by invention, satisfying the aforestated desiderata, comprises two continuous and juxtaposed layers, i.e. a plastic rear layer and a metallic front layer, which are mechanically interconnected at isolated locations while being detached from each other over the major part of their area of contact so as to be independently deformable. The plastic rear layer, forming the eye rims together with the intervening bridge, thus can be readily adapted to the shape of the lenses to be fitted therein; the relatively rigid metallic front layer, terminating in a pair of lateral extensions, carries the temple hinges so as to relieve the plastic layer of any substantial mechanical stress. Between these lateral extensions, the metal layer overlies the plastic layer at the bridge and along contiguous portions of the eye rims, preferably the upper part thereof. If desired, this metallic layer may also extend along the entire contour of the eye rims.

The mechanical connection between the two layers is advantageously located at the bridge and at the hinges. Thus, the hinge-carrying extensions of the metal layer may be provided with brackets having inwardly directed projections which bear from behind upon the plastic layer. The bridge joint may comprise one or more rivets or bolts or may be constituted by at least one cutout in the bridge section of the metal layer interlockingly penetrated by a boss integrally projecting from the corresponding section of the plastic layer.

If the metal layer is cut away to expose major portions of the plastic layer, e.g. along the lower arcs of the eye rims, the availability of differently colored synthetic resins will allow variations in the appearance of the article. Similarly, the metal layer can be formed in different colors (e.g. by an anodizing treatment of aluminum alloys) to provide a choice of patterns.

The invention will be described in greater detail hereinafter with reference to the accompanying drawing in which:

FIG. 7 is a perspective view of a further embodiment;

FIG. 8 is a front view of the frame shown in FIG. 7;

FIG. 9 is an enlarged cross-sectional view taken on the line IX—IX of FIG. 8.

Figure 1:
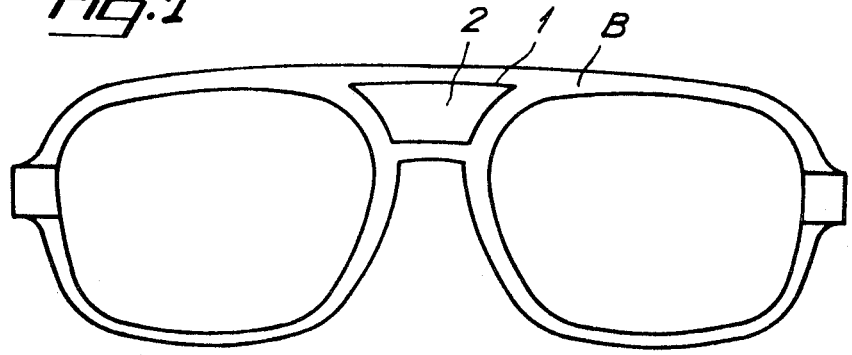
FIG. 1 is a front view of an eyeglass frame embodying the invention.
Figure 2:
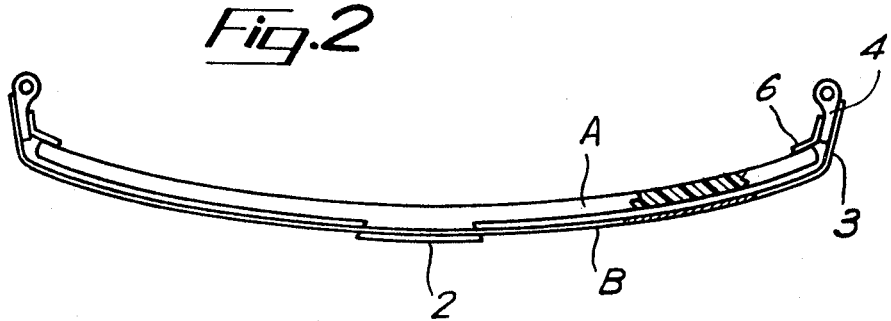
FIG. 2 is a top view of the frame shown in FIG. 1.

In FIGS. 1 and 2 I have shown an eyeglass frame according to the invention consisting, essentially, of a plastic rear layer A and ajuxtaposed metallic front layer B, preferably of aluminum. The two layers are substantially coextensive and define the two eye rims and the bridge of the frame, metal layer B extending laterally at 3 beyond the plastic layer A to form seats for a pair of hinge members 4 more clearly illustrated in FIG. 5. Brackets 6, secured to frame extensions 3 and hinge members 4 by rivets 5 (FIG. 5), bear from behind upon the plastic layer A. The latter also has a forwardly projecting boss 2 which penetrates a cutout 1 in metal layer B and is flattened to form an interlocking connection.

Figure 3:
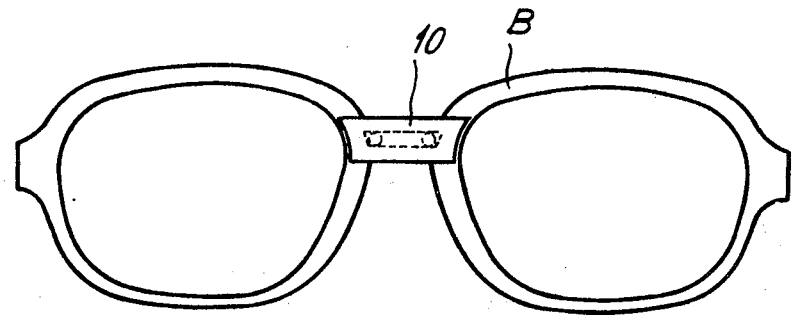
FIGS. 3 and 4 are views similar to FIGS. 1 and 2, respectively, illustrating a modification.
Figure 4:
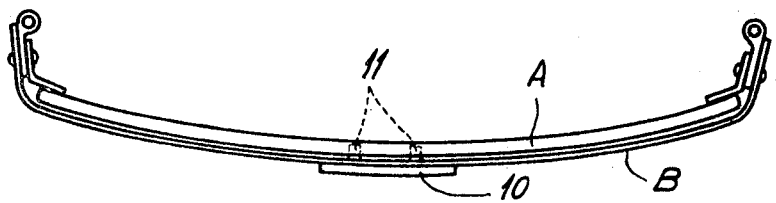

FIGS. 3 and 4 show a generally similar frame wherein, however, a metallic shield 10 overlies the bridge portions of both layers A and B, this shield forming a common head for a pair of bolts 11 traversing both layers for engagement by preferably countersunk nuts 12 as illustrated in FIG. 9.

Figure 5:
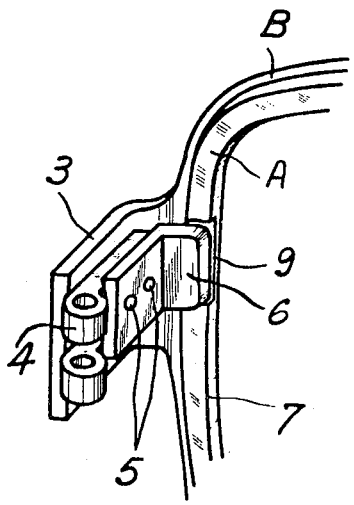
FIGS. 5 and 6 are perspective detail views, drawn to a larger scale, of two types of hinge mountings for a frame as shown in the preceding figures.

As shown in FIG. 5, the inwardly bent lug portion of bracket 6 is received in a recess 9 of the rim section 7 of plastic layer A. In the modified construction shown in FIG. 6, a hinge member 4' is integral with a supporting bracket 6' which is fastened to the extension 3 of layer B by a rivet 5 and by a second rivet with an enlarged head 8 received in a recess 9' of section 7 of layer A.

Figure 6:
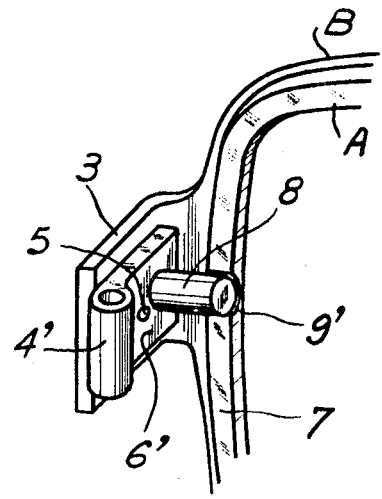

Although the joints shown in FIGS. 5 and 6 securely hold the plastic layer A against the metal layer B, neither construction materially impedes the relative deformability of layer A enabling it to be fitted in the usual manner, with or without heat softening, around a pair of lenses not shown.

FIGS. 7-9 illustrate a frame with a modified metal layer B' covering only the upper parts of the eye rims defined by the plastic layer A. Metal layer B' forms a brow bar extending between lateral extensions 3 along the upper portions of the eye rims and across the bridge which, as shown in FIGS. 3 and 4, forms a mechanical joint between the two layers with the aid of a shield 10 carrying bolts 11 engaged by countersunk nuts 12. Short lobes 13 of layer B' are shown to project, for ornamental purposes, slightly below the bridge piece 10.

As illustrated in dot-dash lines in FIG. 8, the eye rims formed by layer A are readily deformable to accommodate the lenses. These eye rims, of course, may have any of the various configurations customarily used in the trade.

Figure 10:
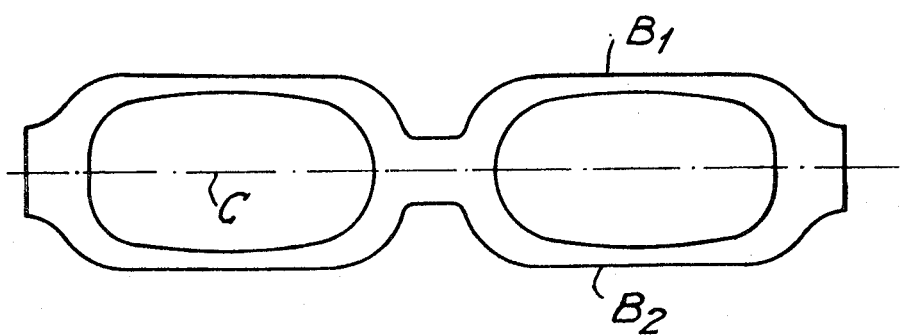
FIG. 10 is a face view of a blank of sheet metal produced in the manufacture of eyeglass frames as shown in FIGS. 7-9.

Layer B or B' can be stamped from a continuous piece of sheet metal and bent into shape without any welding or soldering. When shaping a brow bar similar to that shown in FIGS. 8 and 9, two symmetrical complementary brow bars $B_1$, $B_2$ (FIG. 10) could be stamped, as shown, from a sheet-metal strip and then severed along a median line C.

With the plastic layer only partly overlain by the metal facing, as shown in FIGS. 7 and 8, its exposed portions can be given any desired shape without regard to the configuration of the metallic part which therefore could be standardized for use with a variety of frame models.

It will be apparent that the structure of the hinge joints may be modified, e.g. by bolting or riveting the bracket 6 of FIG. 5 to the rim portion 7 of layer A if a more limited deformability of the latter can be tolerated, and that hinge member 4 or 4' could also be integral with layer extension 3 and/or with bracket 6 or head 8. Furthermore, the bridge joint can likewise be of a construction different from those described and illustrated without departing from the spirit and scope of the invention as defined in the appended claims.

I claim:

1. An eyeglass frame comprising a continuous plastic rear part and a continuous metallic front part juxtaposed therewith, said rear part defining a pair of eye rims and a bridge interconnecting same, said front part extending over said bridge and at least portions of said eye rims contiguous thereto, said front part further having lateral extensions which are laterally bent about the ends of said rear layer and are provided with hinge means for attachment of a pair of temples, said parts being mechanically interconnected at said extensions by said hinge means and being detached from each other over the major part of their area of contact.

2. An eyeglass frame as defined in claim 1 wherein said parts are also mechanically interconnected at said bridge.

3. An eyeglass frame as defined in claim 2 wherein said front part has a cutout at said bridge, said rear part having a boss interlockingly penetrating said cutout.

4. An eyeglass frame as defined in claim 2 wherein said parts are provided with fastening means penetrating same at said bridge.

5. An eyeglass frame as defined in claim 4 wherein said fastening means comprises at least one bolt with a head bearing upon said front part and with a shank engaged by retaining means countersunk in said rear part.

6. An eyeglass frame as defined in claim 1 wherein said hinge means include brackets secured to said extensions and provided with projections bearing from behind upon said rear part.

7. An eyeglass frame as defined in claim 6 wherein said rear part is provided with recesses accommodating said projections.

8. An eyeglass frame as defined in claim 1 wherein said front part overlies said rear part only at said bridge and along the upper part of said eye rims, terminating substantially at the level of said bridge.

9. An eyeglass frame as defined in claim 1 wherein said front part consists of aluminum.

References Cited

UNITED STATES PATENTS

| | | | |
|---|---|---|---|
| 2,495,508 | 1/1950 | Cleaver | 351—52 |
| 2,778,270 | 1/1957 | Pomerance | 351—51 |
| 2,442,483 | 6/1948 | Blasi | 351—51 |
| 3,517,415 | 6/1970 | McGrath et al. | 351—52 |
| 3,052,159 | 9/1962 | Gross et al. | 351—83 |

DAVID SCHONBERG, Primary Examiner

R. L. SHERMAN, Assistant Examiner

U.S. Cl. X.R.

351—51, 102, 154